United States Patent
Jin

(10) Patent No.: US 8,748,506 B2
(45) Date of Patent: Jun. 10, 2014

(54) FLEXIBLE UV CURABLE COATING COMPOSITIONS

(71) Applicant: SDC Technologies, Inc., Irvine, CA (US)

(72) Inventor: Ren-Zhi Jin, Irvine, CA (US)

(73) Assignee: SDC Technologies, Inc., Irvine, CA (US)

( * ) Notice: Subject to any disclaimer, the term of this patent is extended or adjusted under 35 U.S.C. 154(b) by 0 days.

(21) Appl. No.: 13/661,266

(22) Filed: Oct. 26, 2012

(65) Prior Publication Data

US 2013/0274366 A1 Oct. 17, 2013

Related U.S. Application Data

(60) Provisional application No. 61/623,650, filed on Apr. 13, 2012.

(51) Int. Cl.
| | |
|---|---|
| *C03C 25/10* | (2006.01) |
| *C08G 18/67* | (2006.01) |
| *C08J 3/28* | (2006.01) |
| *C08F 2/46* | (2006.01) |
| *C08G 61/04* | (2006.01) |

(52) U.S. Cl.
USPC .................. 522/96; 522/90; 522/113; 522/1; 520/1

(58) Field of Classification Search
USPC ............................... 522/96, 90, 113, 1; 520/1
See application file for complete search history.

(56) References Cited

U.S. PATENT DOCUMENTS

| | | | | |
|---|---|---|---|---|
| 5,260,350 A | * | 11/1993 | Wright | 522/42 |
| 5,368,941 A | * | 11/1994 | Blizzard et al. | 428/412 |
| 5,374,483 A | | 12/1994 | Wright | |
| 6,514,584 B1 | * | 2/2003 | Merlin et al. | 428/36.7 |
| 2013/0065982 A1 | * | 3/2013 | Mitsuoka et al. | 522/90 |

FOREIGN PATENT DOCUMENTS

| | | | |
|---|---|---|---|
| EP | 0687 713 | * | 12/1995 |
| EP | 0687713 A1 | | 12/1995 |
| WO | WO 2011/155139 | * | 12/2011 |

OTHER PUBLICATIONS

Extended European Search Report and Written Opinion for related EP Patent Application No. 12190081.5, dated Jan. 17, 2013.
"Handbook of Coating Additives", Second Edition, edited by John J. Florio et al., pub Marcel Dekker, cover page, pp. iii-vii, 119-145 and 220-269.
Urethane acrylates for high-performance coatings, Web page address of www.bayercoatings.com, accessed Mar. 20, 2012.
UV-Light-Sensitive Urethane Acrylate Oligomers, PCI Paint & Coatings Industry, Web page address of www.pcimag.com/articles, accessed Mar. 20, 2012.

* cited by examiner

*Primary Examiner* — Ling Choi
*Assistant Examiner* — Jessica E Whiteley
(74) *Attorney, Agent, or Firm* — Calfee, Halter & Griswold LLP

(57) ABSTRACT

Disclosed herein are ultraviolet (UV) curable coating compositions that provide transparent, flexible, and abrasion-resistant coatings when cured on a substrate. The coating compositions comprise an adduct of a multifunctional acrylate monomer component and an amino-organofunctional silane; an organic solvent component; an acid; a colloidal silica component; and a multifunctional urethane acrylate oligomer component. The amino-organofunctional silane is represented by the formula $X_aSi[Q^1(NHQ^2)_bNZH]_{4-a}$, where X is an alkoxy group having from 1 to 6 carbon atoms; $Q^1$ and $Q^2$ are the same or different divalent hydrocarbon groups; Z is a hydrogen or a monovalent hydrocarbon group; a is an integer from 1 to 3; and b is an integer from 0 to 6. Also disclosed herein are processes for preparing such coating compositions and articles comprising coatings cured from such coating compositions.

20 Claims, No Drawings

FLEXIBLE UV CURABLE COATING COMPOSITIONS

CROSS-REFERENCE TO RELATED APPLICATION

This application claims priority to and any other benefit of U.S. Provisional Patent Application Ser. No. 61/623,650, filed on Apr. 13, 2012, and entitled "FLEXIBLE UV CURABLE COATING COMPOSITIONS," the entire disclosure of which is incorporated by reference herein.

FIELD OF THE INVENTION

This disclosure relates to ultraviolet (UV) curable organosiloxane coating compositions that provide transparent, flexible, and abrasion-resistant coatings on a substrate when cured. This disclosure also relates to processes for formulating such UV curable organosiloxane coating compositions and articles coated with such UV curable coating compositions.

BACKGROUND

Transparent plastic materials are frequently used in articles that require visibility and clarity through the materials. Examples of such articles include optical lenses, goggles, face shields, face plates for helmets, glazings used as windows in buildings, and glazings used as windshields or windows in buses, airplanes, and other transportation vehicles. However, transparent plastic materials tend to be soft and scratch or mar quite easily, which leads to reduced visibility and clarity through the transparent article.

Coatings have been used to help maintain visibility and clarity through the transparent plastic materials by providing a protective, abrasion-resistant layer over the substrate. Protective, abrasion resistant coatings are typically applied to the transparent plastic material in liquid form and then are cured to form the protective coating. The polymeric components of the coating composition crosslink during the curing process to harden and form the abrasion-resistant, protective coating.

Abrasion resistance and flexibility in organosiloxane protective coatings generally share an inverse relationship. Abrasion resistance in the organosiloxane coating correlates to the hardness of the coating. A harder coating provides a more abrasion-resistant coating than a comparably less hard coating. However, harder organosiloxane coatings are less flexible.

Disclosed herein are UV curable organosiloxane coating compositions that provide both abrasion resistance and flexibility in the cured coating.

SUMMARY OF THE INVENTION

In accordance with embodiments of the present disclosure, ultraviolet (UV) curable organosiloxane coating compositions that provide transparent, flexible, and abrasion-resistant coatings on a substrate when cured, are disclosed herein. The disclosed coating compositions exhibit a flexibility such that the cured coating can be subjected to at least 60% physical deformation from its original cured shape without cracking.

In accordance with one embodiment, the UV curable coating composition comprises an adduct of a multifunctional acrylate monomer component and an amino-organofunctional silane; an organic solvent component; an acid; a colloidal silica component; and a multifunctional urethane acrylate oligomer component. The amino-organofunctional silane is represented by the formula $X_a Si[Q^1(NHQ^2)_b NZH]_{4-a}$, where X is an alkoxy group having from 1 to 6 carbon atoms; $Q^1$ and $Q^2$ are the same or different divalent hydrocarbon groups; Z is a hydrogen or a monovalent hydrocarbon group; a is an integer from 1 to 3; and b is an integer from 0 to 6.

In accordance with the preceding and other embodiments, the multifunctional urethane acrylate oligomer component used in the UV curable coating composition has an average acrylate functionality ranging from greater than 1 to about 10.

In accordance with another embodiment, a multistep process for preparing the UV curable coating composition is disclosed. Initially, a multifunctional acrylate monomer component and an amino-organofunctional silane are reacted together to form an adduct. The adduct is then mixed with an organic solvent component to form a solution. The resulting solution is mixed with an acid. Thereafter, the solution is mixed with a colloidal silica component, followed by mixing a multifunctional urethane acrylate oligomer component with the solution. The amino-organofunctional silane used to form the adduct is represented by the formula $X_a Si[Q^1(NHQ^2)_b NZH]_{4-a}$, where X is an alkoxy group having from 1 to 6 carbon atoms; $Q^1$ and $Q^2$ are the same or different divalent hydrocarbon groups; Z is a hydrogen or a monovalent hydrocarbon group; a is an integer from 1 to 3; and b is an integer from 0 to 6.

In accordance with other embodiments, articles coated with such UV curable coating compositions are disclosed.

Other aspects of the present disclosure will be apparent from the description that follows.

DETAILED DESCRIPTION

Described herein are ultraviolet (UV) curable organosiloxane coating compositions that provide transparent, flexible, and abrasion-resistant coatings on a substrate when cured. In accordance with the embodiments of the present disclosure, the coating compositions comprise an adduct of a multifunctional acrylate monomer component and an amino-organofunctional silane; an organic solvent component; an acid; a colloidal silica component; and a multifunctional urethane acrylate oligomer component.

The cured coatings produced from the coating compositions disclosed herein are flexible. The term "flexible," unless otherwise indicated herein, refers to a cured coating that does not to crack when subjected to at least 60% deformation from its original cured shape and, after such deformation, is still able to provide a transparent and abrasion-resistant protective coating to a substrate. This deformation, as referred to herein, is determined by securing a coated plastic lens between the jaws of a vice, with the thin, perimeter edges of the lens being in contact with each jaw of the vice. The deformation is obtained by compressing the coated lens between the jaws until the lens bends at least 60% from its original configuration, as determined using the distance between the perimeter edges of the lens in its original configuration and the distance between the perimeter edges of the lens in its deformed configuration. The at least 60% deformation of the lens is maintained for at least one minute before releasing the coated lens from the vice and inspecting the coating for cracks. The cured coating compositions disclosed herein do not exhibit cracks when subjected to such deformation, i.e., the cured coatings produced from the coating compositions disclosed herein are flexible.

The cured coatings produced from the coating compositions disclosed herein are also abrasion resistant. The term "abrasion resistant," unless otherwise indicated herein, refers to a coating on a substrate that exhibits more resistance to abrasion, e.g., scratching or marring, as compared to the same, but uncoated, substrate. For example, a coating is abrasion resistant in accordance with this disclosure if a substrate coated with such coating has a higher Bayer number as compared to the Bayer number of the same, but uncoated, substrate. In general, materials with a higher abrasion resistance possess larger Bayer numbers than materials with a lower abrasion resistance. The coating compositions disclosed herein, when cured on a substrate, have a higher Bayer number compared to the Bayer number of the uncoated substrate, i.e., the cured coatings produced from the coating compositions disclosed herein are abrasion resistant.

Multifunctional Acrylate Monomer Component

The coating compositions disclosed herein include an adduct of a multifunctional acrylate monomer component and an amino-organofunctional silane. The multifunctional acrylate monomer used to form the adduct comprises one or more acrylate monomers that collectively have an average acrylate functionality greater than one (1). Acrylate functionality is defined herein as the number of functional groups represented by the formula $CH_2=CRC=OO$, where R is a hydrogen or a methyl group, that are present in one (1) mole of the component, i.e., one (1) mole of the multifunctional acrylate monomer component or one (1) mole of the multifunctional urethane acrylate oligomer component.

As an example of acrylate functionality, a trimethylolpropane triacrylate monomer is represented by the formula $(CH_2=CHC=OOCH_2)_3CC_2H_5$. As shown in its formula, trimethylolpropane triacrylate contains three (3) functional groups represented by the formula $CH_2=CRC=OO$ per one (1) mole of the monomer, where R is a hydrogen (H). Therefore, as defined herein, the trimethylolpropane triacrylate monomer is an acrylate monomer that has an acrylate functionality of three (3). In another example, a neopentyl glycol dimethacrylate monomer is represented by the formula $[CH_2=C(CH_3)C=OOCH_2]_2C(CH_3)_2$. As shown in its formula, neopentyl glycol dimethacrylate contains two (2) functional groups represented by the formula $CH_2=CRC=OO$ per one (1) mole of monomer, where R is a methyl group ($CH_3$). Therefore, as defined herein, the neopentyl glycol dimethacrylate monomer is an acrylate monomer that has an acrylate functionality of two (2).

Thus, in accordance with certain embodiments of the coating compositions disclosed herein, if a single type of acrylate monomer is present in the multifunctional acrylate monomer component, the single type of acrylate monomer present has an acrylate functionality of about two (2) or greater. Examples of suitable types of acrylate monomers that can be used alone in the multifunctional acrylate monomer component include, but are not limited to, diacrylates, triacrylates, tetraacrylates, pentaacrylates, hexaacrylates, and the like.

Examples of suitable diacrylate monomers that are used as the multifunctional acrylate monomer component in accordance with this embodiment include, but are not limited to, 1,6-hexanediol diacrylate; ethylene glycol diacrylate; ethylene glycol dimethacrylate; diethylene glycol diacrylate; triethylene glycol diacrylate; triethylene glycol dimethacrylate; tetraethylene glycol diacrylate; tetraethylene glycol dimethacrylate; polyethylene glycol diacrylate; tripropylene glycol diacrylate; triisopropylene glycol diacrylate; polypropylene glycol dimethacrylate; 1,4-butanediol diacrylate; 1,4-butanediol dimethacrylate; poly(butanediol) diacrylate; neopentyl glycol diacrylate; neopentyl glycol dimethacrylate; 1,3-butylene glycol diacrylate; 1,3-butylene glycol dimethacrylate; 1,12-dodecanediol dimethacrylate; alkoxylated aliphatic diacrylates such as alkoxylated hexanediol diacrylates and alkoxylated neopentyl glycol diacrylates, e.g., propoxylated neopentyl glycol diacrylate; cyclic or polycyclic diacrylates such as cyclohexane dimethanol diacrylate and tricyclodecane dimethanol diacrylate; bisphenol-A diacrylate; bisphenol-A dimethacrylate; alkoxylated bisphenol-A diacrylates such as ethoxylated bisphenol-A diacrylate; alkoxylated bisphenol-A dimethacrylates such as ethoxylated bisphenol-A dimethacrylate; and polyester diacrylates.

Examples of suitable triacrylate monomers that are used as the multifunctional acrylate monomer component in accordance with this embodiment include, but are not limited to, trimethylolpropane triacrylate, trimethylolpropane trimethacrylate, pentaerythritol monohydroxy triacrylate, ethoxylated trimethylolpropane triacrylate, propoxylated glyceryl triacrylate, propoxylated trimethylolpropane triacrylate, and tris(2-hydroxyethyl) isocyanurate triacrylate.

Examples of suitable tetraacrylate monomers that are used as the multifunctional acrylate monomer component in accordance with this embodiment include, but are not limited to, pentaerythritol tetraacrylate and di-trimethylolpropane tetraacrylate.

Examples of suitable pentaacrylate monomers that are used as the multifunctional acrylate monomer component in accordance with this embodiment include, but are not limited to, dipentaerythritol pentaacrylate and sorbitol pentaacrylate.

An example of a suitable hexaacrylate monomer that is used as the multifunctional acrylate monomer component in accordance with this embodiment includes, but is not limited to, dipentaerythritol hexaacrylate.

In other embodiments, the multifunctional acrylate monomer component includes more than one type of acrylate monomer. In accordance with this embodiment, the multifunctional acrylate monomer component can include individual acrylate monomers that have an acrylate functionality of one (1) or greater, but only if the average acrylate functionality of all of the acrylate monomers present in the multifunctional acrylate monomer component is greater than one (1). Thus, in accordance with this embodiment, the multifunctional acrylate monomer component can include monoacrylates in addition to other types of acrylate monomers subject to the condition that the average acrylate functionality of all of the types of acrylate monomers (e.g., any monoacrylates in combination with all of the other types of acrylate monomers) present in the multifunctional acrylate monomer component is greater than one (1). For example, if the multifunctional acrylate monomer component includes one (1) mole of a monoacrylate and one (1) mole of a triacrylate, the average acrylate functionality present in the multifunctional acrylate monomer component is two (2) [e.g., (1 acrylate functional group/1 mol monoacrylate+3 acrylate functional groups/1 mol triacrylate)/2 total mols of acrylate monomers=average acrylate functionality of 2].

Examples of suitable types of acrylate monomers that can be used in accordance with this embodiment, i.e., the embodiment that has more than one type of acrylate monomer in the multifunctional acrylate monomer component, include, but are not limited to, monoacrylates, diacrylates, triacrylates, tetraacrylates, pentaacrylates, hexaacrylates, and the like. The examples of diacrylates, triacrylates, tetraacrylates, pentaacrylates, and hexaacrylates disclosed above are suitable for use as some or all of the acrylate monomers in the multifunctional acrylate monomer component in accordance with this embodiment.

Examples of suitable monoacrylate monomers used in the multifunctional acrylate monomer component in accordance with this embodiment include, but are not limited to, ethylene glycol acrylate; butanediol acrylate; methyl methacrylate; 2(2-ethoxyethoxy) ethyl acrylate; 2-phenoxyethyl acrylate; 2-phenoxyethyl methacrylate; lauryl acrylate; lauryl methacrylate; alkoxylated lauryl acrylates; alkoxylated phenol acrylates such as ethoxylated (4) nonyl phenol acrylate; alkoxylated phenol methacrylates such as ethoxylated (4) nonyl phenol methacrylate; tetrahydrofurfuryl acrylate; tetrahydrofurfuryl methacrylate; alkoxylated tetrahydrofurfuryl acrylates; caprolactone acrylate; cycloaliphatic acrylates such as cyclic trimethylolpropane formal acrylate and 3,3,5-trimethylcyclohexyl acrylate; cycloaliphatic methacrylates such as 3,3,5-trimethylcyclohexyl methacrylate; dicyclopentadienyl methacrylate; diethylene glycol methyl ether methacrylate; isobornyl acrylate; isobornyl methacrylate; isodecyl acrylate; isodecyl methacrylate; isooctyl acrylate; isooctyl methacrylate; methoxy polyethylene glycol acrylate; methoxy polyethylene glycol methacrylate; octyldecyl acrylate; stearyl acrylate; stearyl methacrylate; tridecyl acrylate; tridecyl methacrylate; and triethylene glycol ethyl ether methacrylate.

In accordance with all embodiments of the coating compositions described herein, the multifunctional acrylate monomer component has an average acrylate functionality ranging from greater than 1 to about 10, preferably ranging from about 2 to about 6.

Amino-Organofunctional Silane

As discussed above, the coating compositions disclosed herein include an adduct of a multifunctional acrylate monomer component and an amino-organofunctional silane. Suitable amino-organofunctional silanes used to form the adduct are represented by the following formula:

$$X_a Si[Q^1(NHQ^2)_b NZH]_{4-a},\qquad (I)$$

where X is an alkoxy group having from 1 to 6 carbon atoms; $Q^1$ and $Q^2$ are the same or different divalent hydrocarbon groups; Z is a hydrogen or a monovalent hydrocarbon group; a is an integer from 1 to 3; and b is an integer from 0 to 6.

In accordance with one embodiment of the coating compositions disclosed herein, $Q^1$ and $Q^2$ in formula (I) are the same or different divalent hydrocarbon groups that are represented by the formula $(CH_2)_n$, where n is an integer from 1 to 10, preferably from 1 to 6. In accordance with this or other embodiments, Z in formula (I) is an monovalent hydrocarbon group comprising an alkyl radical containing 1 to 10 carbon atoms, preferably from 1 to 6 carbon atoms.

Examples of preferred amino-organofunctional silanes represented by formula (I) above include 3-aminopropyltrimethoxysilane, 3-aminopropyltriethoxysilane, n-(2-aminoethyl)-3-aminopropyltrimethoxysilane, and 3-(phenylamino)propyltrimethoxysilane.

Adduct

The adduct used in the coating compositions disclosed herein is the reaction product of the multifunctional acrylate monomer component disclosed herein and the amino-organofunctional silane disclosed herein. In accordance with one or more embodiments, the adduct used in the coating composition is the reaction product of a Michael reaction where the amino functionality of the amino-organofunctional silane is the Michael donor and the acrylate functionality (specifically, the α,β unsaturated carbonyl) of the multifunctional acrylate monomer component is the Michael acceptor. In the coating compositions disclosed herein, the molar ratio of the average acrylate functionality of the multifunctional acrylate monomer component to the amino functionality of the amino-organofunctional silane reacted to form the adduct is greater than one (1), preferably about two (2) or greater.

The Michael reaction takes place using neat form reactants, i.e., a neat form multifunctional acrylate monomer component and a neat form amino-organofunctional silane. The term "neat form" used herein refers to a purity of 100% by weight of the particular reactant. Alternatively, the Michael reaction takes place in solution. In certain embodiments, one reactant, i.e., the multifunctional acrylate monomer component or amino-organofunctional silane, is in neat form and the other reactant is in solution. With respect to a solution-type Michael reaction or the combined neat form and solution-type reaction, suitable solvents comprise polar organic solvents including primary or secondary alcohols such as methanol, ethanol, n-propanol, isopropanol, n-butanol, isobutanol, and the like. Other examples of suitable polar organic solvents include ether alcohols such as ethoxyethanol, butoxyethanol, methoxypropanol, and the like. Examples of other suitable solvents include glycol ethers such as propylene glycol methyl ether (PM glycol ether), dipropylene glycol methyl ether, ethylene glycol n-butyl ether, diethylene glycol n-butyl ether, and the like. In accordance with one or more embodiments, the preferred solvent used to prepare the adduct is isopropanol.

The adduct used in the coating compositions disclosed herein is prepared at temperatures ranging from about 20° C. to about 100° C. Although an increase in temperature for the Michael reaction increases the rate of reaction, acrylate functionality may be lost at higher temperatures due to increases in free radical initiated chain reactions attributable to the temperature. Therefore, the preferred temperature for the Michael reaction is room temperature, i.e., about 20° C. to about 25° C.

The time needed to form the adduct depends on various factors, such as the temperature and solvent of the reaction. At the preferred room temperature reaction temperature, it takes about 2 hours to about 72 hours to sufficiently react the multifunctional acrylate monomer component and the amino-organofunctional silane, whether reacted in solution, neat form, or combined solution and neat form, to prepare the adduct suitable for use in the coating compositions disclosed herein. Preferably, the reaction takes place in about 2 to about 4 hours at room temperature.

Organic Solvent Component

The coating compositions disclosed herein include an organic solvent component. The organic solvent component comprises one or more organic solvents that are added during the preparation of the coating composition. These one or more organic solvents may be added at different points during the preparation of the coating composition. These one or more organic solvents are added as an individual solvent component or as part of another component. For example, as discussed above, the coating compositions disclosed herein include an adduct that can be prepared in solution with an organic solvent. Furthermore, other components used in the coating compositions disclosed herein, such as the colloidal silica component or the multifunctional urethane acrylate oligomer component, may be in a solution, suspension, or dispersion form and consequently contain amounts of organic solvent that are added along with its respective component (e.g., the colloidal silica or the multifunctional urethane acrylate oligomer) to the coating composition. In such embodiments, any residual organic solvent present with the adduct or other components used in the coating composition is considered to be part of the one or more of the organic solvents that collectively form the organic solvent component of the coating composition.

In accordance with one or more embodiments of the coating compositions disclosed herein, during the process for preparing the coating composition, the adduct is mixed with an organic solvent component comprising a first organic solvent to form a solution. One or more additional organic solvents, e.g., a second organic solvent, a third organic solvent, etc., which may be the same or different as the first organic solvent, can be added at different points during the process for preparing of the coating composition. As discussed above, the one or more additional organic solvents added at different points can be part of another component, e.g., the adduct, the colloidal silica component, the multifunctional urethane acrylate oligomer component, etc.

Examples of suitable organic solvents that are used as the organic solvent component in the coating compositions disclosed herein include, but are not limited to, ketones such as methylethylketone, methylisobutyl ketone, diacetone alcohol, 3,3-dimethyl-2-butanone, pentanedione, and the like; esters such as n-butyl acetate, isobutyl acetate, and propylene glycol methyl ether acetate; the glycol ethers disclosed herein; and alcohols such as the primary and secondary alcohols disclosed herein as well as the ether alcohols disclosed herein.

Acid

The coating compositions disclosed herein include an acid. During the preparation of the coating composition, an acid is added to neutralize unreacted, i.e., residue, amino functional groups, the adduct, and other components which can be neutralized that are present in the solution. Thus, any acid that can neutralize the residue amino groups, the adduct, and the other components present in the solution is suitable for use in the coating compositions disclosed herein. Non-limiting examples of suitable types of acids include carboxylic acids or inorganic acids. Specific examples of suitable carboxylic acids include, but are not limited to, acrylic acid, acetic acid, and formic acid. Specific examples of suitable inorganic acids include, but are not limited to, dilute hydrochloric acid and dilute nitric acid. The term "dilute" as used herein refers to a 0.1 N acid solution (where N is the normality or gram equivalent weight of a solute per liter of solution). In a preferred embodiment, the acid used with the coating compositions disclosed herein is acrylic acid.

As discussed above, the acid is added to neutralize the residue amino functional groups, the adduct, and other components present in the solution. Preferably, this occurs before the addition of the colloidal silica, e.g., after the adduct is mixed with the organic solvent component but before the addition of the colloidal silica component to the solution.

Colloidal Silica

The coating compositions disclosed herein include a colloidal silica component. The colloidal silica component comprises one or more types of colloidal silica. Colloidal silica, as used herein, refers to a dispersion of fine, amorphous particles of silica, i.e., $SiO_2$, in a liquid phase. Suitable liquid phases for the colloidal silica component include water, an organic solvent, or combinations of water and an organic solvent. Generally, the silica particles in a colloidal dispersion are spherical in nature. In accordance with embodiments disclosed herein, the one or more colloidal silica used as the colloidal silica component have a solids content ranging from about 10% to about 50% by weight, preferably from about 20% to about 40% by weight, and have a mean particle diameter size up to about 200 nm, preferably less than about 100 nm, and more preferably less than about 50 nm. Colloidal silica is generally available in acidic or basic form, either of which are used in the coating compositions disclosed herein.

The colloidal silica, when added to the coating compositions disclosed herein, is considered a reactive material. This is due, at least in part, to hydroxyl functional groups present on the surface of the colloidal silica particles. These surface bound hydroxyls can react with other components in the coating composition. Therefore, the order in which the colloidal silica is added during the preparation of the coating compositions disclosed herein can be determinative of the final properties of the cured coating composition because the colloidal silica may react differently with different components at different points during its preparation, thereby providing different properties in the cured coating. Preferably, the colloidal silica component is added during the preparation of the coating compositions disclosed herein after the acid is added but before the multifunctional urethane acrylate component is added. In accordance with one or more embodiments, it is preferred that the colloidal silica is added during the preparation of the coating compositions disclosed herein under vigorous agitation, and left to stir for a period of time, preferably for about 0.50 to about 1.50 hours, before the multifunctional urethane acrylate component is added.

The addition of the colloidal silica to the coating compositions enhances the abrasion resistance of the cured coating. However, the addition of too much of the colloidal silica negatively impacts film formation for the cured coating. In accordance with the embodiments disclosed herein, the coating compositions disclosed herein include up to about 60% colloidal silica by weight of solids of the coating composition.

Multifunctional Urethane Acrylate Oligomer Component

The coating compositions disclosed herein include a multifunctional urethane acrylate oligomer component. The multifunctional urethane acrylate oligomer component comprises one or more urethane acrylate oligomers that collectively have an average acrylate functionality, in accordance with the definition of acrylate functionality previously disclosed herein, greater than one (1). Each of the one or more urethane acrylate oligomers that collectively form the multifunctional urethane acrylate oligomer component are characterized by the occurrence of one or more urethane groups represented by the formula NHC=OO. Such urethane acrylate oligomers are prepared by reacting multifunctional isocyanates with polyols to form monomers having the one or more urethane groups. The monomers having one or more urethane groups are then end-capped with acrylate monomers by reacting the monomers having one or more urethane groups with hydroxyl-functional acrylate monomers, thereby resulting in a urethane acrylate oligomer. One of ordinary skill in the art would understand how to control the acrylate functionality of the urethane acrylate oligomer to form multifunctional oligomers suitable for the multifunctional urethane acrylate oligomer component.

In accordance with certain embodiments of the coating compositions disclosed herein, if a single type of urethane acrylate oligomer is present in the multifunctional urethane acrylate oligomer component, the single type of urethane acrylate oligomer present has an acrylate functionality of about two (2) or greater. Examples of suitable types of urethane acrylate oligomers that can be used alone in the multifunctional urethane acrylate oligomer component include, but are not limited to, urethane diacrylates, urethane triacrylates, urethane tetraacrylates, urethane pentaacrylates, urethane hexaacrylates, and the like. Preferably, in accordance with this and other embodiments, the urethane acrylate oligomers used alone in the multifunctional urethane acrylate oligomer component are aliphatic urethane acrylate oligomers.

In other embodiments, the multifunctional urethane acrylate oligomer component can include more than one type of urethane acrylate oligomer. In accordance with this embodiment, the multifunctional acrylate monomer component can include individual urethane acrylate oligomers that have an acrylate functionality of one (1) or greater, only if the average acrylate functionality of all of the urethane acrylate oligomers present in the multifunctional urethane acrylate oligomer component is greater than one (1). The same methodology described above with respect to how monoacrylate monomers can be incorporated into the multifunctional acrylate monomer component applies with the instant multifunctional urethane acrylate oligomer component. Thus, in accordance with this embodiment, the multifunctional urethane acrylate oligomer component can include urethane monoacrylate oligomers in addition to other types of urethane acrylate oligomers subject to the condition that the average acrylate functionality of all of the urethane acrylate oligomers (e.g., monoacrylates in combination with all of the other types of urethane acrylate oligomers) present in the multifunctional urethane acrylate oligomer component is greater than one (1).

Examples of suitable urethane acrylate oligomers that can be used in accordance with this embodiment, i.e., the embodiment that has more than one type of urethane acrylate oligomers in the multifunctional urethane acrylate oligomer component, include, but are not limited to, urethane monoacrylates, urethane diacrylates, urethane triacrylates, urethane tetraacrylates, urethane pentaacrylates, urethane hexaacrylates, and the like. Preferably, in accordance with this and other embodiments, the urethane acrylate oligomers used in combination with other urethane acrylate oligomers in the multifunctional urethane acrylate oligomer component are aliphatic urethane acrylate oligomers. In accordance with certain embodiments, aromatic urethane acrylate oligomers are used in combination with aliphatic urethane acrylate oligomers as the multifunctional urethane acrylate oligomer component in the coating compositions disclosed herein.

In accordance with all embodiments of the coating compositions described herein, the multifunctional urethane acrylate oligomer component has an average acrylate functionality ranging from greater than 1 to about 10, preferably ranging from about 2 to about 6.

Photoinitiator

In accordance with one or more embodiments, the coating compositions disclosed herein include a photoinitiator. The photoinitiator present in the coating composition initiates and advances the crosslinking, i.e, curing, of the coating composition when the coating composition is exposed to UV radiation. The photoinitiators do this by generating radicals when exposed to the UV radiation. The radicals, in turn, initiate and advance the polymerization, i.e., crosslinking, of the coating composition during cure. The photoinitiator can be added at any point during the process for preparing the coating composition.

Examples of suitable UV radiation sensitive photoinitiators or blends of initiators used in coating compositions disclosed herein include, but are not limited to, benzoin; substituted benzoins such as butyl isomers of benzoin ethers; benzophenone; substituted benzophenones such as hydroxy benzophenone; 2-hydroxyethyl-N-maleimide; 2-[2-hydroxyethyl(methyl)amino]ethanol anthraquinone; thioxanthone; α,α-diethoxyacetophenone; 2,2-dimethoxy-1,2-diphenylethan-1-one; 2-hydroxy-2-methyl-1-phenyl-propan-1-one; diphenyl(2,4,6-trimethylbenzoyl)phosphine oxide, phenyl glyoxylic acid methyl ester; 1-hydroxylcyclohexyl phenyl ketone; 2-benzyl-2-dimethylamino-1-(4-morpholinophenyl)-butanone-1; 2-dimethylamino-2-(4-methylbenzyl)-1-(4-morpholin-4-yl-phenyl)-butan-1-one; 2-methyl-1-[4-(methylthio)phenyl]-2-morpholinopropan-1-one; and 1-[4-(2-hydroxyethoxy)-phenyl]-2-hydroxy-2-methyl-1-propane-1-one.

In accordance with one or more embodiments, the coating compositions disclosed herein are optionally cured using electron beam (EB) radiation. The coating compositions in accordance with this embodiment do not require a photoinitiator. However, because EB radiation has a different wavelength than UV radiation, the coating cured using EB radiation may have a different crosslink density as compared to the coating cured using UV radiation, all other conditions being held equal. One of ordinary skill in the art would recognize this and adjust the cure parameters to obtain the transparent, flexible, and abrasion-resistant coatings obtained using UV radiation.

Leveling Agents

In accordance with one or more embodiments, the coating compositions disclosed herein include a leveling agent. The leveling agent, which may also be known as a flow-control agent, is incorporated into the coating compositions described herein to spread the composition more evenly or level on the surface of the substrate and to provide substantially uniform contact with the substrate. The amount of the leveling agent can vary widely but preferably is used in an amount ranging from about 0.001% to about 10% leveling agent by weight solids of the coating composition. Any conventional, commercially available leveling agent which is compatible with the coating composition and the substrate, which is capable of leveling the coating composition on a substrate, and which enhances wetting between the coating composition and the substrate is employed. Non-limiting examples of such leveling agents include polyethers, silicones, fluorosurfactants, polyacrylates, silicone polyacrylates such as silicone hexaacrylate, and fluoro-modified polyacrylates.

Additives

Other additives that optionally are used in the coating compositions disclosed herein are also well known to those of skill in the art, such as UV light stabilizers as described in Calbo, Leonard J., "The Handbook of Coatings Additives," 2nd Ed. (Marcel Dekker, Inc., 2004), pp. 159-234, the contents of which are incorporated by reference herein. In the embodiments of the coating composition disclosed herein that are cured using UV radiation, one of ordinary skill in the art would recognize the type and amount of UV light stabilizers that may be used to impart increased weatherability to the transparent, flexible, and abrasion-resistant coatings disclosed herein.

Substrates

The coating compositions disclosed herein are applied as a coating to rigid substrate surfaces or to firm substrate surfaces that are sufficiently elastic to withstand further processing of the substrate, such as flexing or bending, without loss of its properties and without undergoing a non-reversible plastic deformation. A variety of substrates are employed. Among the preferred substrate materials include transparent plastics such as polycarbonate, polarized polycarbonate, polyamide, polyacrylic, polymethacrylic, polyvinylchloride, polybisallyl carbonate, polyethylene terephthalate, polyethylene naphthenate, polyurethane, and polythiourethane. Other substrates include various polyolefins, fluorinated polymers, metals and glass, such as soda-lime glass, borosilicate glass, acrylic glass among other types of glass, are used with appropriate pretreatments, if necessary.

The coating compositions described herein are applied in any suitable manner to a substrate. For example, the compositions of the present disclosure are applied to solid substrates by conventional methods, such as flow coating, spray coating, curtain coating, dip coating, spin coating, roll coating, and the like to form a continuous surface film on the substrate. The coating compositions are then cured by exposing the coated substrate to UV radiation provided by UV lamps, and in some embodiments, EB radiation provided by EB accelerators, both techniques of which are known to those skilled in the art.

Example Embodiments

In accordance with one embodiment of the coating compositions disclosed herein, a coating composition which provides a flexible and abrasion-resistant coating when cured comprises an adduct of a multifunctional acrylate monomer component and an amino-organofunctional silane; an organic solvent component; an acid; a colloidal silica component; and a multifunctional urethane acrylate oligomer component. The amino-organofunctional silane is represented by formula (I) disclosed herein, i.e., $X_aSi[Q^1(NHQ^2)_bNZH]_{4-a}$, where X is an alkoxy group having from 1 to 6 carbon atoms, $Q^1$ and $Q^2$ are the same or different divalent hydrocarbon groups, Z is a hydrogen or a monovalent hydrocarbon group, a is an integer from 1 to 3, and b is an integer from 0 to 6. In accordance with this and other preceding embodiments, the coating composition exhibits a flexibility such that the cured coating is subject to physical deformation of at least 60% of its original cured shape without cracking.

In accordance with this and other preceding embodiments, the multifunctional urethane acrylate oligomer component has an average acrylate functionality ranging from greater than 1 to 10. In accordance with the preceding embodiment, the multifunctional urethane acrylate oligomer component is selected from the group consisting of urethane monoacrylates, urethane diacrylates, urethane triacrylates, urethane tetraacrylates, urethane pentaacrylates, urethane hexaacrylates, and combinations thereof.

Further in accordance with this and other preceding embodiments, the multifunctional acrylate monomer component has an average acrylate functionality ranging from greater than 1 to 10. In accordance with the preceding embodiment, the multifunctional acrylate monomer component is one or more monomers selected from the group consisting of monoacrylates, diacrylates, triacrylates, tetraacrylates, pentaacrylates, hexaacrylates, and combinations thereof.

In accordance with this and other preceding embodiments, the amino-organofunctional silane is selected from the group consisting of 3-aminopropyltrimethoxysilane, 3-aminopropyltriethoxysilane, n-(2-aminoethyl)-3-aminopropyltrimethoxysilane, and 3-(phenylamino)propyltrimethoxysilane. Furthermore, in accordance with this and other preceding embodiments, a molar ratio of an average acrylate functionality of the multifunctional acrylate monomer component to an amino functionality of the amino-organofunctional silane is greater than one (1).

Further in accordance with this and other preceding embodiments, the acid is a carboxylic acid or an inorganic acid. Moreover, in accordance with this and other preceding embodiments, the organic solvent component is selected from the group consisting of ketones, esters, glycol ethers, alcohols, and combinations thereof. Additionally, in accordance with this and other preceding embodiments, the colloidal silica component is a dispersion of silica particles in a liquid phase. The liquid phase of the colloidal silica component comprises water, an organic solvent, or a combination thereof.

In accordance with this and other preceding embodiments, the coating composition further comprises a photoinitiator.

Further in accordance with this and other preceding embodiments, the coating composition further comprises a leveling agent.

In accordance with another embodiment, the present disclosure provides processes for preparing the UV curable coating compositions disclosed herein. In one embodiment, the process comprises reacting a multifunctional acrylate monomer component and an amino-organofunctional silane to form an adduct; mixing an organic solvent component with the adduct to form a solution; mixing an acid with the solution; thereafter mixing a colloidal silica component with the solution; and thereafter mixing a multifunctional urethane acrylate oligomer component with the solution. The amino-organofunctional silane is represented by formula (I) disclosed herein, i.e., $X_aSi[Q^1(NHQ^2)_bNZH]_{4-a}$, where X is an alkoxy group having from 1 to 6 carbon atoms, $Q^1$ and $Q^2$ are the same or different divalent hydrocarbon groups, Z is a hydrogen or a monovalent hydrocarbon group, a is an integer from 1 to 3, and b is an integer from 0 to 6. The coating composition prepared in accordance with this embodiment and other preceding embodiments exhibits a flexibility such that the cured coating is subjected to physical deformation of at least 60% of its original cured shape without cracking. In accordance with this and other preceding embodiments, the organic solvent component comprises a first organic solvent.

In accordance with this and other preceding embodiments, the multifunctional urethane acrylate oligomer component has an average acrylate functionality ranging from greater than 1 to 10. Further in accordance with the preceding embodiment, the multifunctional urethane acrylate oligomer component is selected from the group consisting of urethane monoacrylates, urethane diacrylates, urethane triacrylates, urethane tetraacrylates, urethane pentaacrylates, urethane hexaacrylates, and combinations thereof.

Moreover, the multifunctional acrylate monomer component has an average acrylate functionality ranging from greater than 1 to 10 in accordance with this and other preceding embodiments. Further in accordance with the preceding embodiment, the multifunctional acrylate monomer component is one or more monomers selected from the group consisting of monoacrylates, diacrylates, triacrylates, tetraacrylates, pentaacrylates, hexaacrylates, and combinations thereof.

In accordance with this and other preceding embodiments, the amino-organofunctional silane is selected from the group consisting of 3-aminopropyltrimethoxysilane, 3-aminopropyltriethoxysilane, n-(2-aminoethyl)-3-aminopropyltrimethoxysilane, and 3-(phenylamino)propyltrimethoxysilane. Furthermore, in accordance with this and other preceding embodiments, a molar ratio of an average acrylate functionality of the multifunctional acrylate monomer component to an amino functionality of the amino-organofunctional silane is greater than one (1).

In accordance with this and other preceding embodiments, the process for preparing the UV curable coating composition further comprises the step of adding a photoinitiator to the solution. As discussed above, the photoinitiator can be added at any point during the preparation of the coating composition.

Further in accordance with this and other preceding embodiments, the process for preparing the UV curable coating composition further comprises the step of adding a leveling agent to the solution. The leveling agent can be added at any point during the preparation of the coating composition.

In accordance with this and other preceding embodiments, the process for preparing the UV coating composition disclosed herein further comprises the step of adding a second organic solvent to dilute the solution. The second organic solvent is the same or different from the first organic solvent. The second organic solvent forms a portion of the organic solvent component of the coating composition prepared in accordance with this and other preceding embodiments. This step of adding the second organic solvent follows the step of mixing the acid with the solution and precedes the step of mixing the colloidal silica component with the solution.

In accordance with another embodiment, the present disclosure provides articles. The articles comprise a substrate and a coating formed on at least one surface of the substrate. The coating is formed by curing a coating composition in accordance with the coating compositions disclosed herein directly on the substrate. Alternatively, the coating is formed by curing a coating composition in accordance with the coating compositions disclosed herein on primer-coated substrate. The primer on the primer coated substrate embodiment is at least partially cured prior to applying the coating compositions disclosed herein.

As used in the description of the invention and the appended claims, the singular forms "a," "an," and "the" are intended to include the plural forms as well, unless the context clearly indicates otherwise.

All references incorporated herein by reference are incorporated in their entirety unless otherwise stated.

The following examples are for purposes of illustration only and are not intended to limit the scope of the claims which are appended hereto.

EXAMPLES

List of Materials Used in the Following Examples

DAROCUR 1173: 2-Hydroxy-2-methyl-1-phenyl-propan-1-one (available from BASF Resins of Ludwigshafen, Germany).

EBECRYL 220: An aromatic urethane hexaacrylate (available from Cytec Industries of Woodland Park, N.J.).

EBECRYL 1039: A urethane monoacrylate (available from Cytec Industries).

EBECRYL 1360: A silicone hexaacrylate (available from Cytec Industries).

EBECRYL 4858: An aliphatic urethane diacrylate (available from Cytec Industries).

EBECRYL 8701: An aliphatic urethane triacrylate (available from Cytec Industries).

EBECRYL 8702: An aliphatic urethane hexaacrylate (available from Cytec Industries).

NALCO 1034A: A colloidal silica dispersion containing about 34% by weight solids content in water having a pH of about 3.1 and a mean particle size of 20 nm (available from Nalco Company of Naperville, Ill.).

OG401-31: A colloidal silica dispersion containing about 30% by weight solids content in ethylene glycol mono-n-propyl ether and having a mean particle size of about 13 nm (available from Clariant Corporation of Charlotte, N.C.).

Example 1

A mixture of 6.90 grams (g) of 3-aminopropyltrimethoxysilane and 10.7 g of hexanedioldiacrylate is stirred at room temperature for 3 hours. To the mixture, 19.8 g of propylene glycol methyl ether (PM glycol ether) is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 4858 and 75.7 g of n-butyl acetate are added. The resulting coating composition is stirred for an additional 30 minutes to ensure mixing.

This coating composition is applied to a polycarbonate lens by dip-coating at a withdrawal rate of 5.5 inches per minute (ipm) at room temperature. The coated lens air dries for 5 minutes before being cured with 1 pass per side under a 500 Watts/inch UV lamp, equipped with a Fusion H bulb, at an intensity of 1.2 J/cm$^2$ to provide a cured coating having a thickness of 4.20 microns (µm).

The abrasion resistance of the coating is evaluated in the following manner. A commercially available alundum (grain code 1524, 12 grit, alundum ZF) sold by Saint-Gobain Ceramic Materials of Canada is used as the abrasive material, and a Colts Laboratory BTE Abrasion tester, sold by Colts Laboratories of Oldsmar, Fla., is used as the testing tool. In this test, 500 grams alumdum is loaded into a 9$\frac{5}{16}$ inch×10$\frac{1}{2}$ inch cradle fitted with two lenses, one of which is a reference one poly(diethylene glycol-bis-allyl carbonate) lens, herein referred to as ADC lens, and the other being the coated lens of this Example. These two lenses are subjected to a 4 inch stroke at an oscillation frequency of 150 strokes per minute for a total of 4 minutes. The ADC reference lens used is a Silor 70 mm plano FSV lens, purchased through Essilor of America, Inc. of St. Petersburg, Fla. The haze generated on each lens from this test is measured on a BYK Gardner Haze-gard Plus hazemeter of Columbia, Md. The haze gain for each lens was determined as the difference between the initial haze on the lens, i.e., taken prior to the testing described above, and the haze after testing. The ratio of the haze gain on the ADC reference lens to the haze gain on the coated lens of this Example is then reported as the resultant abrasion resistance of the coating material. A ratio of greater than 1 indicates a coating which provides greater abrasion resistance than the uncoated ADC reference lens. The ratio is commonly referred to as the Bayer number (or the Bayer ratio or the Bayer value). The Bayer number for the coating of this Example is 1.26. The Bayer number for an uncoated polycarbonate lens is determined in the same manner as described above for the coated polycarbonate lens of this Example. The Bayer number of the uncoated polycarbonate lens is 0.25. Thus, the cured coating of this Example is abrasion resistant because the Bayer number of the lens coated with this coating composition is greater than that of the uncoated polycarbonate lens.

The flexibility of the coating is evaluated on a vice. The flexibility is measured by securing the coated lens between the jaws of a vice, with the thin, perimeter edges of the coated lens being in contact with each jaw of the vice. The coated lens is deformed by operating the vice to compress the lens between the jaws until the lens bends 60% from its original configuration, as determined using the distance between the perimeter edges of the lens in its original configuration and the distance between the perimeter edges of the lens in its deformed configuration. The lens is compressed from an original distance of 72 mm between the perimeter edges of the lens in its original configuration down to a distance of 29 mm between the same perimeter edges of the lens. The deformation is held for one minute, and then the coated lens is released from the vice. The coated lens is then examined for cracks. No cracks are observed in the coating at 60% deformation of the lens on the vice.

Example 2

A mixture of 6.90 g of 3-aminopropyltrimethoxysilane and 10.7 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 8701 and 75.7 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 5.00 µm and a Bayer number of 1.19. The Bayer number for this coating is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 3

A mixture of 6.90 g of 3-aminopropyltrimethoxysilane and 10.7 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 8702 and 75.7 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 5.50 µm and a Bayer number of 0.82. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 4

A mixture of 8.96 g of 3-aminopropyltrimethoxysilane and 13.9 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 4858 and 70.4 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.93 µm and a Bayer number of 1.09. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 5

A mixture of 4.83 g of 3-aminopropyltrimethoxysilane and 7.47 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 4858 and 81.0 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.56 µm and a Bayer number of 1.01. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 6

A mixture of 6.90 g of 3-aminopropyltrimethoxysilane and 10.7 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 82.7 g of NALCO 1034A is added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 4858 and 75.7 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.97 µm and a Bayer number of 1.08. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 7

A mixture of 6.90 g of 3-aminopropyltrimethoxysilane and 10.7 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, a solution of 7.6 g of EBECRYL 220 and 7.6 g of n-butyl acetate, and a solution of 68.1 g of EBECRYL 4858 and 68.1 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.62 µm and a Bayer number of 1.48. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 8

A mixture of 6.90 g of 3-aminopropyltrimethoxysilane and 10.7 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, a solution of 7.6 g of EBECRYL 8702 and 7.6 g of n-butyl acetate, and a solution of 68.1 g of EBECRYL 4858 and 68.1 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.7 µm and a Bayer number of 1.15. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 9

A mixture of 6.90 g of 3-aminopropyltrimethoxysilane and 10.7 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, a solution of 7.6 g of EBECRYL 8701 and 7.6 g of n-butyl acetate, and a solution of 68.1 g of EBECRYL 4858 and 68.1 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.5 µm and a Bayer number of 1.18. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 10

A mixture of 6.90 g of 3-aminopropyltrimethoxysilane and 10.7 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, a solution of 7.6 g of EBECRYL 1039 and 7.6 g of n-butyl acetate, and a solution of 68.1 g of EBECRYL 4858 and 68.1 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.43 μm and a Bayer number of 0.76. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 11

A mixture of 6.90 g of 3-aminopropyltrimethoxysilane and 10.7 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, a solution of 7.6 g of EBECRYL 220 and 7.6 g of n-butyl acetate, a solution of 7.6 g of EBECRYL 1039 and 7.6 g of n-butyl acetate, and a solution of 60.6 g of EBECRYL 4858 and 60.6 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.54 μm and a Bayer number of 1.09. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 12

A mixture of 6.90 g of 3-aminopropyltrimethoxysilane, 1.07 g of 2-(2-ethoxyethoxy)ethyl acrylate, and 9.61 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 4858 and 75.7 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.50 μm and a Bayer number of 1.08. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 13

A mixture of 6.90 g of 3-aminopropyltrimethoxysilane and 10.7 g of ethylene glycol dimethacrylate is stirred at 100° C. for 2 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 4858 and 75.7 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 3.87 μm and a Bayer number of 0.50. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 14

A mixture of 6.90 g of 3-aminopropyltrimethoxysilane, 1.07 g of ethylene glycol dimethacrylate, and 9.61 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 4858 and 75.7 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 3.91 μm and a Bayer number of 0.88. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Example 15

A mixture of 6.90 g of 3-aminopropyltrimethoxysilane, 1.07 g of dicyclopentadienyl methacrylate, and 9.61 g of hexanedioldiacrylate is stirred at room temperature for 3 hours. To the mixture, 19.8 g of PM glycol ether is added. The resulting mixture is stirred at room temperature for 1 minute. Then, 1.20 g of acrylic acid is added, and the mixture is stirred for 5 minutes. The mixture is diluted by adding 74.1 g of isopropanol. Next, 58.6 g of OG401-31 and 24.1 g of NALCO 1034A are added under vigorous agitation. The resulting mixture is stirred at room temperature for 1 hour. 0.52 g of a solution of EBECRYL 1360 (50% by weight in PM glycol ether), 2.76 g of DAROCUR 1173, and a solution of 75.7 g of EBECRYL 4858 and 75.7 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.39 μm and a Bayer number of 0.86. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. No cracks are observed in the coating at a 60% deformation of the lens on the vice.

Comparative Example 1

No Multifunctional Urethane Acrylate Oligomer Component

A mixture of 9.94 g of 3-aminopropyltrimethoxysilane and 15.4 g of hexanedioldiacrylate is stirred at room temperature for 3 hours. To the mixture, 28.5 g of PM glycol ether is added. The resulting mixture is stirred at room temperature for 1 minute. Then, 1.73 g of acrylic acid is added, and the mixture is stirred for 5 minutes. The mixture is diluted by adding 106.7 g of isopropanol. Next, 84.4 g of OG401-31 and 34.7 g of NALCO 1034A are added under vigorous agitation. The resulting mixture is stirred at room temperature for 1 hour. 0.74 g of a solution of EBECRYL 1360 (50% by weight in PM glycol ether), 3.98 g of DAROCUR 1173, and 64.8 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 3.00 μm and a Bayer number of 1.62. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. A severe crack is observed in the coating at a 60% deformation of the lens on the vice.

Comparative Example 2

No Adduct of a Multifunctional Acrylate Monomer Component and a Amino-Organofunctional Silane A mixture of 19.8 g of PM glycol ether, 1.20 g of acrylic acid, and 74.1 g of isopropanol is added to a mixture of 58.6 grams of OG401-31 and 24.1 grams of Nalco 1034A under vigorous agitation. The resulting mixture is stirred at room temperature for 10 min. To this mixture, 0.52 g of a solution of EBECRYL 1360 (50% by weight in PM glycol ether), 2.76 g of DAROCUR 1173, and a solution of 93.3 g of EBECRYL 4858 and 75.7 g of n-butyl acetate are added. The resulting coating composition is stirred for an additional 30 minutes to ensure mixing.

This coating composition is applied to a polycarbonate lens and cured in the same manner as set forth in Example 1. The resulting cured coating has a severe visible haze, which provides poor visibility and clarity through the lens.

Comparative Example 3

No Multifunctional Urethane Acrylate Oligomer Component

A mixture of 5.40 g of 3-aminopropyltrimethoxysilane, 6.80 g of hexanedioldiacrylate, 19.0 g of trimethylolpropane triacrylate, and 57.9 g of isopropanol is stirred at room temperature for 72 hours. To the mixture, 1.15 g of acetic acid is added, and the mixture is stirred for 5 minutes. Next, 56.2 g of NALCO 1034A is added under vigorous agitation. The resulting mixture is stirred at room temperature for 1 hour. 0.34 g of a solution of EBECRYL 1360 (50% by weight in PM glycol ether) and 1.80 g of DAROCUR 1173 are added. The resulting coating composition is stirred for an additional 30 minutes to ensure mixing.

This coating composition is applied to a polycarbonate lens and cured in the same manner as set forth in Example 1. The resulting cured coating has a thickness of 4.30 μm and a Bayer number of 1.56. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. A severe crack is observed in the coating at a 60% deformation of the lens on the vice.

Comparative Example 4

An Aromatic Multifunctional Urethane Acrylate Oligomer without an Aliphatic Multifunctional Urethane Acrylate Oligomer A mixture of 6.90 grams of aminopropyltrimethoxysilane and 10.7 grams of hexanedioldiacrylate is stirred at room temperature for 3 hours. To the mixture, 19.8 grams of PM glycol ether is added. The resulting mixture is stirred at room temperature for 1 min. Then, 1.20 grams of acylic acid is added, and the mixture is stirred for 5 min. The mixture is diluted by adding of 74.1 grams of isopropanol. Next, 58.6 grams of OG401-31 and 24.1 grams of Nalco 1034A are added under vigorous agitation. The resulting mixture is stirred at room temperature for one hour. 0.52 grams of a solution of Ebecryl 1360, (50% by weight in PM glycol ether), 2.76 grams of Darocur 1173, and a solution of 75.7 grams of Ebecryl 220 and 75.7 grams of butyl acetate are added. The resulting coating composition is stirred for an additional 30 minutes to ensure mixing.

This coating composition is applied to a polycarbonate lens and cured in the same manner as set forth in Example 1. The resulting cured coating has a thickness of 4.6 μm and a Bayer number of 1.65. The Bayer number is determined in the same manner as set forth in Example 1. As mentioned in Example 1, the Bayer number of an uncoated polycarbonate lens, which is subjected to the same conditions as the coated lens of this Example, is 0.25. Thus, this cured coating is abrasion resistant because the Bayer number of the lens coated with this coating composition is greater than that of the uncoated polycarbonate lens. The flexibility of the coating is evaluated on a vice in the same manner as set forth in Example 1. Severe cracks are observed in the coating at a 60% deformation of the lens on the vice.

It will be understood that various changes may be made without departing from the scope of the invention, which is not to be considered limited to what is described in the description.

What is claimed is:

1. A coating composition which provides a flexible and abrasion-resistant coating when cured, the coating composition comprising:

an adduct of a multifunctional acrylate monomer component and an amino-organofunctional silane, wherein the amino-organofunctional silane is represented by the formula:

$X_aSi[Q^1(NHQ^2)_bNZH]_{4-a}$, where:

X is an alkoxy group having from 1 to 6 carbon atoms,
$Q^1$ and $Q^2$ are the same or different divalent hydrocarbon groups,
Z is a hydrogen or a monovalent hydrocarbon group,
a is an integer from 1 to 3, and
b is an integer from 0 to 6;
an organic solvent component;
an acid;
a colloidal silica component; and
a multifunctional urethane acrylate oligomer component.

2. The composition of claim 1, wherein the multifunctional urethane acrylate oligomer component has an average acrylate functionality ranging from greater than 1 to 10.

3. The composition of claim 2, wherein the multifunctional urethane acrylate oligomer component is selected from the group consisting of urethane monoacrylates, urethane diacrylates, urethane triacrylates, urethane tetraacrylates, urethane pentaacrylates, urethane hexaacrylates, and combinations thereof.

4. The composition of claim 1, wherein the multifunctional acrylate monomer component has an average acrylate functionality ranging from greater than 1 to 10.

5. The composition of claim 4, wherein the multifunctional acrylate monomer component is one or more monomers selected from the group consisting of monoacrylates, diacrylates, triacrylates, tetraacrylates, pentaacrylates, hexaacrylates, and combinations thereof.

6. The composition of claim 1, wherein a molar ratio of an average acrylate functionality of the multifunctional acrylate monomer component to an amino functionality of the amino-organofunctional silane is greater than 1.

7. The composition of claim 1, wherein the amino-organofunctional silane is selected from the group consisting of 3-aminopropyltrimethoxysilane, 3-aminopropyltriethoxysilane, n-(2-aminoethyl)-3-aminopropyltrimethoxysilane, and 3-(phenylamino)propyltrimethoxysilane.

8. The composition of claim 1, wherein the acid is a carboxylic acid or an inorganic acid.

9. The composition of claim 1, wherein the organic solvent component is selected from the group consisting of ketones, esters, glycol ethers, alcohols, and combinations thereof.

10. The composition of claim 1, wherein the colloidal silica component is a dispersion of silica particles in a liquid phase, wherein the liquid phase comprises water, an organic solvent, or a combination thereof.

11. The composition of claim 1 further comprising a photoinitiator.

12. A process for preparing a coating composition, comprising:

reacting a multifunctional acrylate monomer component and an amino-organofunctional silane to form an adduct, wherein the amino-organofunctional silane is represented by the formula:

$X_aSi[Q^1(NHQ^2)_bNZH]_{4-a}$, where:

X is an alkoxy group having from 1 to 6 carbon atoms,
$Q^1$ and $Q^2$ are the same or different divalent hydrocarbon groups,
Z is a hydrogen or a monovalent hydrocarbon group,
a is an integer from 1 to 3, and
b is an integer from 0 to 6;
mixing an organic solvent component with the adduct to form a solution;
mixing an acid with the solution;
thereafter mixing a colloidal silica component with the solution; and
thereafter mixing a multifunctional urethane acrylate oligomer component with the solution.

13. The process of claim 12, wherein the multifunctional urethane acrylate oligomer component has an average acrylate functionality ranging from greater than 1 to 10.

14. The process of claim 13, wherein the multifunctional urethane acrylate oligomer component is selected from the group consisting of urethane monoacrylates, urethane diacrylates, urethane triacrylates, urethane tetraacrylates, urethane pentaacrylates, urethane hexaacrylates, and combinations thereof.

15. The process of claim 12, wherein the multifunctional acrylate monomer component has an average acrylate functionality ranging from greater than 1 to 10.

16. The process of claim 15, wherein the multifunctional acrylate monomer component is one or more monomers selected from the group consisting of monoacrylates, diacrylates, triacrylates, tetraacrylates, pentaacrylates, hexaacrylates, and combinations thereof.

17. The process of claim 12, wherein a molar ratio of an average acrylate functionality of the multifunctional acrylate monomer component to an amino functionality of the amino-organofunctional silane is greater than 1.

18. The process of claim 12, wherein the amino-organofunctional silane is selected from the group consisting of 3-aminopropyltrimethoxysilane, 3-aminopropyltriethoxysilane, n-(2-aminoethyl)-3-aminopropyltrimethoxysilane, and 3-(phenylamino)propyltrimethoxysilane.

19. The process of claim 12, further comprising the step of adding a photoinitiator to the solution.

20. An article, comprising a substrate and a coating formed on at least one surface of the substrate by curing the coating composition of claim 1.

* * * * *